United States Patent

[11] 3,626,294

[72] Inventor Charles H. Dancy
Getzville, N.Y.

[21] Appl. No. 54,537
[22] Filed July 13, 1970
[45] Patented Dec. 7, 1971
[73] Assignee Sylvania Electric Products Inc.

[54] CARRIER-PLUS-NOISE TO NOISE-OPERATED AM SQUELCH CIRCUIT
12 Claims, 4 Drawing Figs.

[52] U.S. Cl. 325/478, 325/403, 325/410, 325/414, 325/474, 325/477, 325/482, 329/50
[51] Int. Cl. H04b 1/10
[50] Field of Search 325/323, 324, 326, 346–349, 402, 403, 408–410, 414, 473, 474, 476–478, 480, 482; 328/133; 329/50, 140, 147

[56] References Cited

UNITED STATES PATENTS

| | | | |
|---|---|---|---|
| 2,468,030 | 4/1949 | Bullock | 325/474 |
| 3,056,087 | 9/1962 | Broadhead et al. | 325/478 |

*Primary Examiner*—Robert L. Griffin
*Assistant Examiner*—Albert J. Mayer
*Attorneys*—Norman J. O'Malley, Elmer J. Nealon and Edward J. Coleman ABSTRACT: In an AM radio receiver including a mixer, IF amplifier, detector and audio output section, a squelch circuit which operates on the basis of a synchronously averaged carrier-plus-noise to noise ratio sensing of the received signal. The squelch circuit comprises a signal amplitude limiter and a discriminator for processing the IF output signal to derive noise power inversely related to received carrier power. An amplitude modulator is provided at the input, output or bias source of the discriminator for synchronously modulating the derived noise power in response to the demodulated signal output of the detector. This modulated noise power is then processed through a noise filter, a dual time constant rectifier and a threshold sensor for providing a gate control signal for muting the audio output in response to excessive noise.

INVENTOR.
Charles H. Darcy
BY Edward J. Coleman
AGENT.

INVENTOR.
Charles H. Duncy
BY Edward Coleman
AGENT.

INVENTOR.
Charles H. Dancy
BY Edward Coleman
AGENT.

CARRIER-PLUS-NOISE TO NOISE-OPERATED AM SQUELCH CIRCUIT

BACKGROUND OF THE INVENTION

This invention relates generally to AM radio receivers and, more particularly, to an improved carrier-plus-noise to noise-operated squelch circuit for such receivers.

It is a desirable and often essential practice to provide means for muting communication receivers when the noise level becomes too high or during periods of no signal reception, when only noise is present in the receiver. There are many known types of signal-to-noise operating squelch circuits to carry out this function. In high-gain AM receiver applications, such as military and commercial aircraft radios and other two-way radio sets, a particularly suitable type of squelch circuit is that which operates on a carrier-plus-noise to noise ratio sensing of the received signal. A typical prior art AM squelch circuit of this type employs a hard band-pass limiter and a discriminator for processing the output signal from the receiver IF amplifier to derive noise power inversely related to received carrier power. More specifically, the output of the limiter comprises carrier-plus-noise power, a quantity which remains constant. The result of discriminating this constant power signal is to provide a noise power representation which at each instant in time is inversely related to carrier power; i.e., in the presence of a strong carrier, noise power is substantially reduced.

The noise power at the output of the discriminator is then filtered for a specific portion of the noise spectrum above the modulation frequencies, and the filtered noise is amplified and applied via a dual time constant rectifier to a threshold sensing circuit such as a Schmitt trigger. A direct current control signal from the threshold circuit is then applied to an audio gate for muting the receiver in response to excessive noise.

This prior art squelch approach works very well for low percentages of amplitude modulation and also for most voice communication. When high-percentage amplitude modulation or even overmodulation occurs, however, the noise power to be sensed at that instant of time becomes much greater. This is due to the fact that at the instant of overmodulation, the carrier-plus-noise to noise ratio is reduced to near 0 db. and thereby provides a condition whereby the noise captures the limiter. With no suppression of noise by the carrier in the limiter, the noise power to be sensed goes to some maximum value, as determined by the limiter design. If the high amplitude modulation or overmodulation persists for a long enough time duration, viz, a period exceeding the squelch time constant of the circuit, the system can malfunction by muting the receiver on the sensed noise power, even though on average voice power (averaging between 30 percent and 40 percent amplitude modulation) the threshold action is quite normal. An example of a situation where high average amplitude modulation can be more prevalent is in the case of receiving a signal that has been speech processed using audio clipping techniques. Such a processed signal presents a serious problem to a carrier-plus-noise to noise ratio squelch system, notwithstanding the typical method of counteracting the effects of high AM bursts by appropriate choices of rectifier filter network time constants.

SUMMARY OF THE INVENTION

Accordingly, it is an object of the present invention to provide an improved squelch circuit for AM radio receivers.

It is another object of the invention to provide an averaging carrier-plus-noise to noise ratio operated squelch circuit for AM radio receivers.

Briefly, these objects are attained in an AM radio receiver including a signal detector and audio reproducing means by a squelch circuit comprising, means for processing a received amplitude modulated carrier signal to derive noise power inversely related to received carrier power, and means for synchronously modulating the derived noise power in response to the output of the signal detector. The squelch circuit further includes means for filtering the modulated noise power to pass noise in a selected range of frequencies above the modulating frequencies of the received signal, means for rectifying the filtered noise power to provide a direct current signal of representative amplitude, and means controlled by the direct current signal for muting the audio signal reproducing means in the presence of excessive noise.

BRIEF DESCRIPTION OF THE DRAWINGS

This invention will be more fully described hereinafter in conjunction with the accompanying drawings, in which.

DESCRIPTION OF PREFERRED EMBODIMENT

For a better understanding of the present invention together with other and further objects, advantages and capabilities thereof, reference is made to the following disclosure and appended claims in connection with the above-described drawings.

Figure 1:
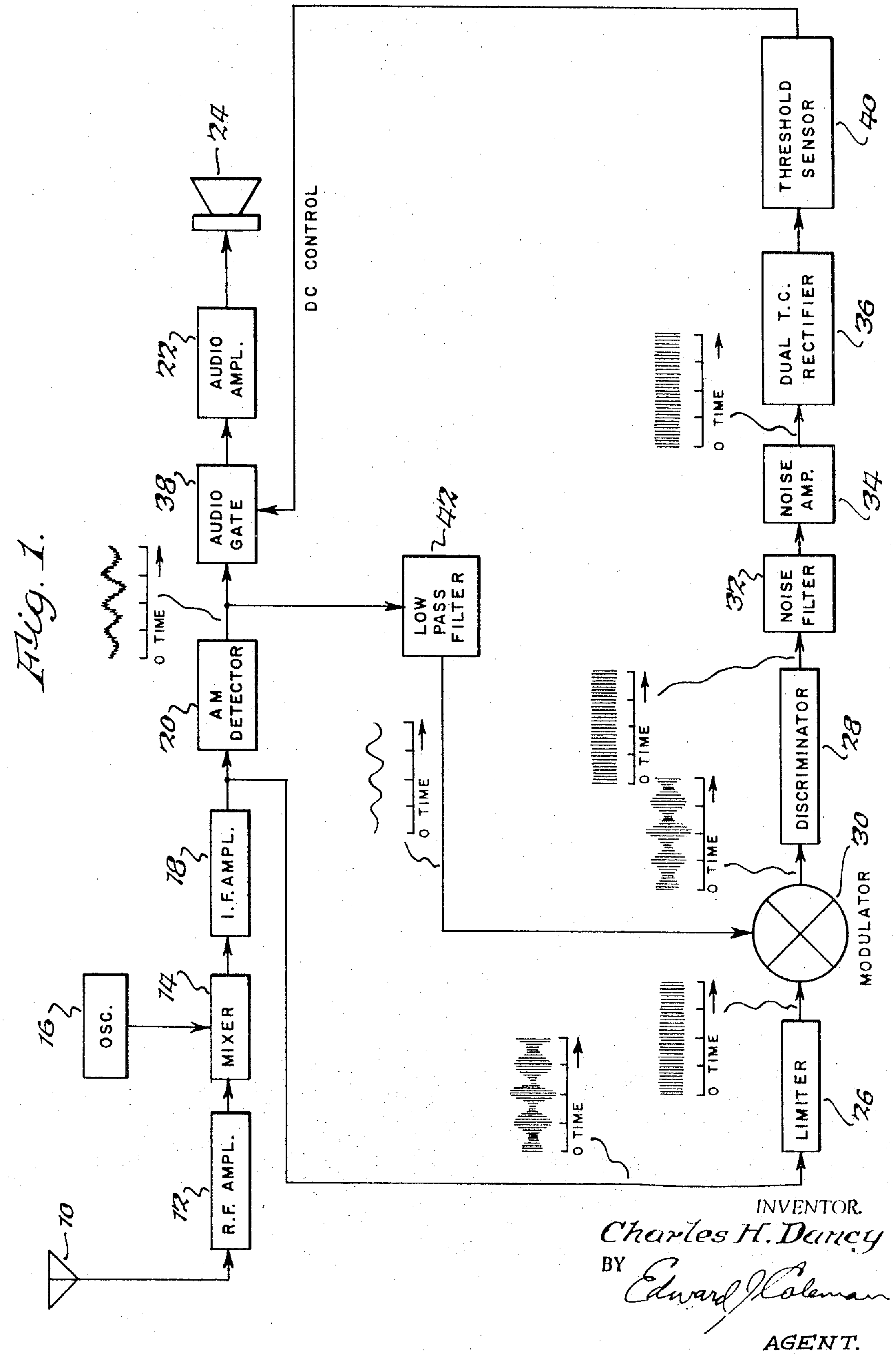
FIG. 1 is a block diagram of an AM radio receiver including a squelch circuit in accordance with the invention.

In the receiver of FIG. 1, the amplitude-modulated carrier signal is received by the antenna 10 and applied via a radio frequency (RF) amplifier 12 to a mixer stage 14. Signals from a local oscillator 16 are also applied to mixer stage 14 to provide an intermediate frequency (IF) signal which is applied to an IF amplifier 18. An AM detector 20 is connected at the output of IF amplifier 18 for demodulating the received signal, which is thereupon coupled to a suitable audio amplifier 22. The output of amplifier 22 is applied to a loudspeaker 24 for reproducing the originally transmitted audio signal.

In accordance with the present invention, the receiver of FIG. 1 further includes a hard band-pass limiter 26 and a frequency discriminator 28 for processing the received amplitude-modulated carrier signal at the output of IF amplifier 18 to derive noise power inversely related to received carrier power. A modulator 30 is connected between the limiter and discriminator for synchronously modulating the derived noise power in response to the demodulated signal output of AM detector 20. A high pass or band-pass noise filter 32 is connected at the output of discriminator 28 for filtering the modulated derived noise power to pass a portion of the noise power spectrum in a selected range of frequencies above the modulating frequencies of the received signal. The filtered noise is then coupled through an amplifier 34 to a dual time constant rectifier circuit 36, which is operative to rectify the filtered noise power to provide a direct current (DC) signal of representative amplitude for controlling an audio gate 38 connected between AM detector 20 and audio amplifier 22. Gate 38 is thereupon operative in response to the DC squelch control signal for muting audio signal reproduction in the presence of excessive noise. For the usual case where a binary mode of squelch control is desired, a threshold sensor 40 such as a Schmitt trigger circuit, is coupled between the output of rectifier 36 and the control terminal of gate 38, whereby the threshold sensor is operative to actuate the gate in response to a direct current signal from the rectifier having an amplitude exceeding a preselected threshold level.

Circuit 26 is a signal amplitude limiter having its input connected to the output of IF amplifier 18 and may include one or more stages to provide sufficient limiting so that virtually all of the amplitude information is stripped off the received signal except envelope minima which do not exceed the limiting level; this is illustrated by the waveforms shown at the input and output of limiter 26. Accordingly, limiter 26 provides a constant output power comprised of received carrier power plus received noise power (C+N). Discriminator 28 operates upon this limiter output to remove the carrier frequency power so that only the noise power remains. As the (C+N) output of limiter 26 has a constant power, the derived noise power at the output of the discriminator is inversely related to the received carrier power; i.e., in the presence of strong received carrier power, the derived noise will be at a very low level, whereas a weak carrier will yield a high noise level. Filter 32, amplifier 34 and rectifier 36 thereupon function to detect this derived noise and provide a DC control signal which is representative of the carrier-plus-noise to noise ratio, (C+N)/N, for operating the squelch gate 38 via threshold sensor 40.

Figure 4:
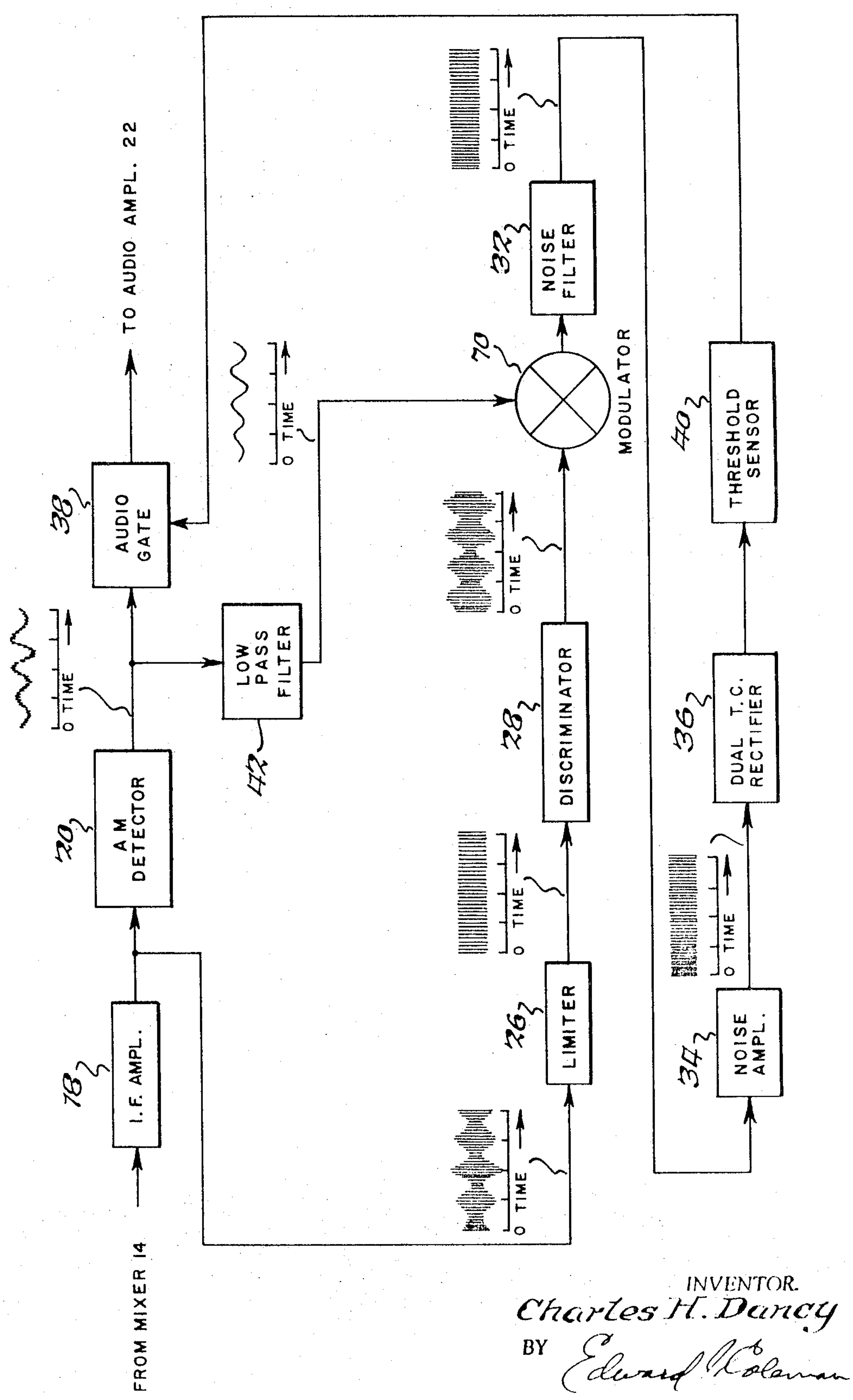
FIG. 4 is a block diagram of an AM radio receiver including a second alternative embodiment of a squelch circuit in accordance with the invention

If the output of limiter 26 were applied directly to discriminator 28 without modulation, and the received carrier had a high percentage of amplitude modulation or was overmodulated, the discriminator output would appear very much like that shown in FIG. 4 with the noise envelope varying from a condition of high noise power at instants of overmodulation, yielding a (C+N)/N near 0 db., to a condition of low noise power at instants of low-percentage amplitude modulation. If the high-percentage modulation or overmodulation persists for a period exceeding the squelch time constant of the circuit, the system can potentially malfunction by squelching or muting audio reproduction even though on the average the received voice power is quite normal.

Figures 2, 3:
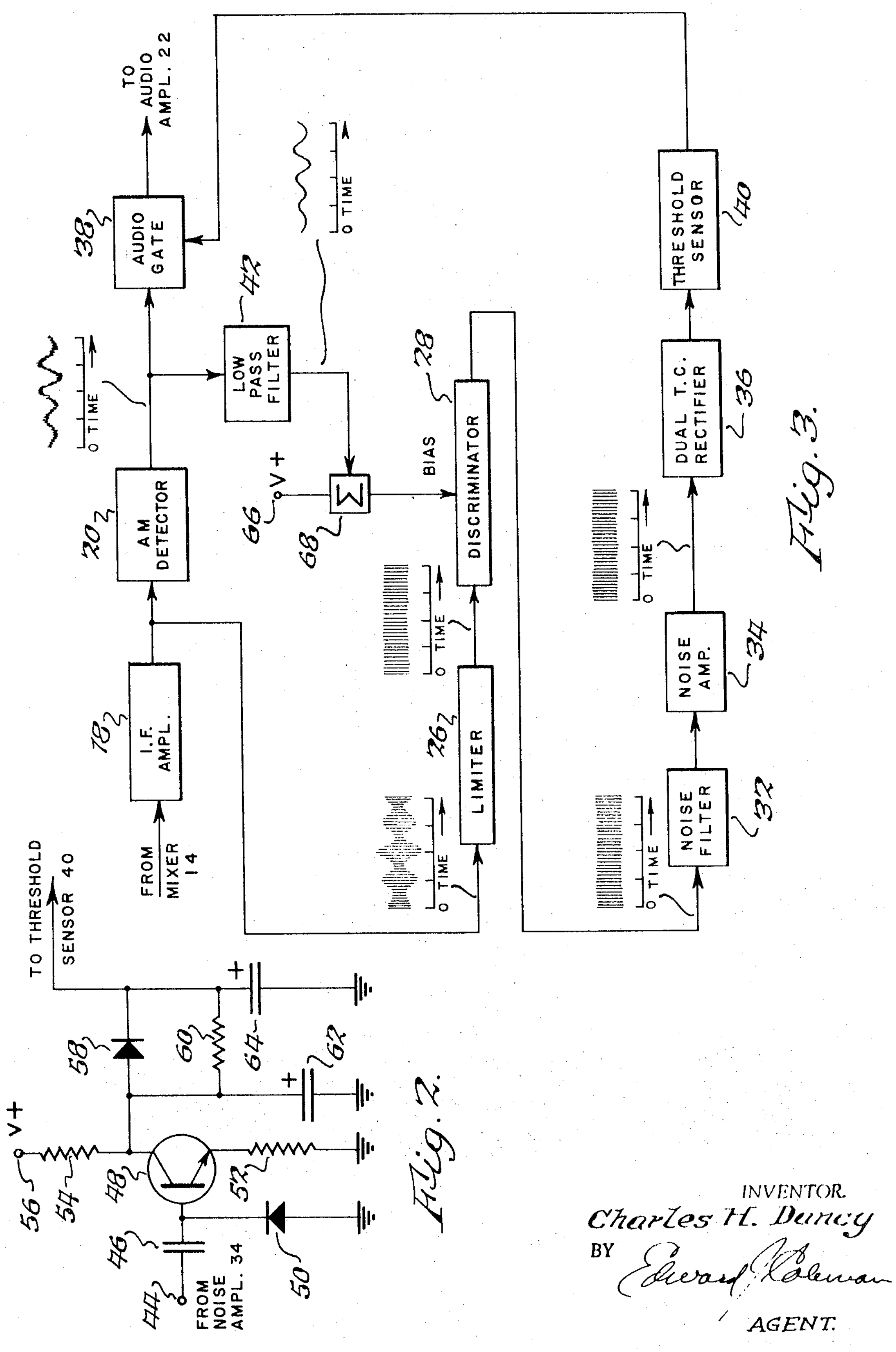
FIG. 2 is a schematic diagram of a dual time constant rectifier circuit useful in the squelch system of FIG. 1.
FIG. 3 is a block diagram of an AM radio receiver including a first alternative embodiment of a squelch circuit in accordance with the invention.

Hence, a particular feature of the present invention is the provision of an averaging (C+N)/N operated squelch system which synchronously compensates, or modulates, the noise power sensed for the squelch decision proportionally with the modulation envelope to thereby eliminate the high noise bursts at instances of high or overmodulation. Specifically, this "averaging" approach maintains the sensed noise power at a constant level over the entire modulation envelope, while still being inversely related to the average carrier level due to the hard limiting provided by circuit 26. The synchronous compensation, or modulation, of the sensed noise power can be accomplished at several alternative points in the squelch system, as illustrated by FIGS. 1, 3 and 4. The approach illustrated in FIG. 1 is to employ an amplitude modulator 30, such as a conventional mixer circuit, having a first input connected to the output of limiter 26, a second input to which the output of AM detector 20 is coupled via a low pass filter 42, and an output connected to the input of discriminator 28. The cutoff frequency of low pass filter 42 is selected to be high enough (e.g., above 1.5 kHz.) to allow significant modulating frequencies through and to keep the phase shift at those frequencies to a minimum, yet low enough to substantially attenuate any noise frequencies. The demodulated AM envelope with noise is illustrated by the waveform at the output of detector 20, and the filtered AM envelope with the noise removed is illustrated by the waveform at the output of filter 42.

Modulation of the (C+N) power at the output of hard limiter 26 with the AM envelope in modulator 30 provides drive power to the discriminator which is inversely related to the percentage of amplitude modulation, as illustrated by the waveform at the output of modulator 30. Thus, the output power of discriminator 28 will be less at instants of time when the (C+N) power is predominately noise power and slightly larger when (C+N)/N increases. The degree of inverse modulation at the input to the discriminator can be adjusted by appropriate selection of the gain of modulator 30 or level control at the output of low pass filter 42 to make the sensed noise power constant with respect to the AM envelope but still inversely related to carrier power. This compensated noise power is illustrated by the waveform at the output of discriminator 28.

Noise filter 32 may be a high pass filter or band-pass filter operative to pass noise power in a frequency range having a minimum approximately an octave above the highest modulating frequency expected for the receiver. In this manner, the noise filter will substantially attenuate the second harmonics of voice and noise modulating products so as only to pass true noise power for squelch sensing. If the minimum cutoff frequency of filter 32 were lower, chances of squelch malfunctioning would be increased, as the fluttering with a loud voice would appear like noise. The gain and bandwidth of filter 32 are determined by the If and audio amplifier system configuration. In a typical squelch system, the lower cutoff frequency for filter 32 would be about 13 Hz., and for the case of a band-pass filter, a 6 kHz. bandwidth would be accommodated.

The filtered noise power is then applied via amplifier 34 to the rectifier 36, which includes a filter network having a short charging time constant and a long discharge time constant. Such a dual time constant rectifier, or noise detector, is typically employed in prior art (C+N)/N squelch circuits for providing an averaging or holding function for short voice peaks. Thus, the dual time constant rectifier is aimed at the same general problem for which the present invention provides a solution, however, the synchronous compensation provided by the use of modulator 30 averages across time to provide a significantly more effective means of preventing squelch malfunctions than the dual time constant rectifier, which compensates only for the short voice peaks. Hence, when employing synchronous modulation of noise power in accordance with the present invention, the use of a dual time constant filter network in rectifier 36 is somewhat redundant and may be eliminated if modulator 30 is adjusted to provide sufficient compensation, as previously mentioned.

A typical dual time constant rectifier circuit useful as block 36 of the squelch system is shown in FIG. 2. An input terminal 44, which represents the output of noise filter 32 is connected via coupling capacitor 46 to the base electrode of a transistor 48. The transistor base electrode is also connected to ground via rectifier 50, which is oriented with its cathode connected to the base of transistor 48. The emitter of transistor 48 is connected via resistor 52 to ground, and its collector is connected through a resistor 54 to a source of positive direct current supply voltage, represented by terminal 56. Connected between the collector of transistor 48 and the threshold sensor 40 is a gating diode 58 having a resistor 60 connected there across. A capacitor 62 is connected from the junction of the collector of transistor 48 and anode of diode 58 to ground, and a capacitor 64 is connected between the cathode of diode 58 and ground.

Rectification of the noise from amplifier 34 is provided by diode 50 and the base emitter junction of transistor 48, the transistor also providing the requisite DC gain. The dual time constant filter network is composed of the illustrated collector circuitry and the emitter resistor of transistor 48. The value of resistor 54 is selected such that in the presence of input noise power of a low enough level to cause transistor 48 to be cut off, capacitor 62 will be rapidly charged via resistor 54, and capacitor 64 will also be rapidly charged via resistor 54 and the forward biased gating diode 58. With low carrier power and, consequently, increased noise power, transistor 48 will conduct causing an abrupt drop in its collector voltage whereby the gating diode 58 will be reverse biased due to the charge on capacitor 64. Under these conditions, capacitor 64 slowly discharges through a high impedance path to ground provided by resistor 60, conducting transistor 48, and emitter resistor 52. The following are typical circuit values:

| | |
|---|---|
| Resistor 52 | 100 ohms |
| Resistor 54 | 18,000 ohms |
| Resistor 60 | 120,000 ohms |
| Capacitor 62 | 1 microfarad |
| Capacitor 64 | 10 microfarads |

Threshold sensor 40 may comprise a Schmitt trigger circuit operative to be actuated when the DC output of rectifier 36 exceeds a preselected threshold level, such a DC threshold exceedence level being representative of the sensing of excessive noise power. Accordingly, threshold sensor 40 provides a binary DC control signal for operating the audio gate 38, which may comprise a relay, diode, amplifier, or other voltage-responsive device to open the audio circuit of the receiver in the presence of objectionably high noise levels. Thus, if the output of sensor 40 indicates excessive noise, the resulting DC control signal will energize a relay coil, or reverse bias a diode, or bias an amplifier to cutoff to squelch the receiver. In some applications, it may be desirable to omit threshold sensor 40 and connect the DC control signal from rectifier 36 directly to audio gate 38. The resulting analog control of squelch provides a more gradual actuation of muting, rather than the abrupt squelching action of binary control.

An alternative embodiment of the invention is illustrated in FIG. 3, wherein circuit elements corresponding to those in FIG. 1 are identified with like reference numerals. A necessary prerequisite of this embodiment of the invention is that discriminator 28 must be capable of operating over some range of efficiencies, and the efficiency and thus output of the discriminator must be controllable by adjustment of the operating bias thereof. The circuit of FIG. 3 is similar to that of FIG. 1 except that the output of limiter 26 is connected directly to discriminator 28 and the synchronous compensation or modulation of the noise power is accomplished by varying the operating bias of the discriminator with the detected AM envelope. More specifically, discriminator 28 has a source of positive direct current bias voltage represented by terminal 66, and means such as a summing network 68 is provided for connecting the output of low pass filter 42 to the source of bias voltage from terminal 66 in a manner operative to amplitude modulate the bias voltage for the discriminator in response to the filtered, demodulated signal output of detector 20. Modulation of the operating bias with the AM envelope in this manner will vary the discriminator efficiency inversely related to the percentage of amplitude modulation. Accordingly, the output of discriminator 28 will be less at instances of time when the limiter output is predominately noise power and slightly larger when the (C+N)/N increases. By appropriate selection of the bias source at terminal 66, or providing level control of the output of filter 42, the degree of inverse modulation introduced at the discriminator can be adjusted to make the sensed noise power constant as a function of the AM envelope, but still inversely related to the carrier.

Another alternative embodiment of the invention is illustrated by FIG. 4, which is similar to FIG. 1 except that the output of the limiter is connected directly to the discriminator and the synchronous compensation of noise is provided by the insertion of an amplitude modulator between the discriminator output and the noise filter. Accordingly, circuit elements of FIG. 4 corresponding to those of FIG. 1 are identified with like reference numerals. In FIG. 4, the envelope varying noise power output of discriminator 28 is applied to the first input of an amplitude modulator circuit 70; the detected AM envelope from low pass filter 42 is applied to a second input of modulator 70; while the output of the modulator is connected to noise filter 32. This modulation of the noise power output of discriminator 28 with the AM envelope provides an output to the noise filter which is inversely related to the percentage of amplitude modulation. As a consequence, the input to the noise filter will be less at instants of time when the limiter output is predominately noise power and slightly larger when (C+N)/N increases. The degree of inverse modulation can be adjusted by appropriate selection of the gain of modulator 70 or control of the output level of filter 42 to make the sensed noise power constant as a function of AM envelope, but still inversely related to carrier power.

In summary, the present invention provides a significantly improved (C+N)/N squelch system by using the detected AM envelope to synchronously compensate or modulate sensed noise power to be independent of the AM envelope yet inversely related to carrier power, as is desired in such a system. The approach is compatible to all AM systems, including those using speech processed audio modulation. With potential squelch malfunctions on high AM virtually eliminated, the need for lengthy time constant stages for squelch decision making is removed. The approach represents a true averaging carrier-plus-noise to noise ratio operated squelch system.

Although the invention has been described with respect to certain embodiments, it will be appreciated that modifications and changes may be made by those skilled in the art without departing from the true spirit and scope of the invention.

What is claimed is:

1. In a radio receiver for receiving an amplitude modulated carrier signal and having a detector for demodulating said received signal and means for reproducing an audio signal from the demodulated signal output of said detector, a squelch circuit comprising, in combination, means for processing said received amplitude modulated carrier signal to derive noise power inversely related to received carrier power, means for synchronously modulating said derived noise power in response to the demodulated signal output of said detector, means for filtering said modulated derived noise power to pass noise power in a selected range of frequencies above the modulating frequencies of said received signal, means for rectifying said filtered noise power to provide a direct current signal of representative amplitude, and means controlled by said direct current signal for muting said audio signal reproducing means in the presence of excessive noise.

2. The combination of claim 1 wherein said means for processing the received signal to derive noise power comprises a signal amplitude limiter, means coupling said received amplitude modulated carrier signal to said limiter, and a discriminator circuit coupled between said limiter and said filtering means.

3. The combination of claim 2 wherein said modulating means comprises an amplitude modulator having a first input connected to the output of said limiter, a second input coupled to the output of said detector, and an output connected to the input of said discriminator.

4. The combination of claim 3 wherein said modulating means further includes a low pass filter coupled between the output of said detector and the second input of said amplitude modulator.

5. The combination of claim 2 wherein said discriminator circuit has a source of bias voltage, and said modulating means comprises a low pass filter having an input connected to the output of said detector, and means connecting the output of said low pass filter to said source of bias voltage in a manner operative to amplitude modulate the bias voltage for said discriminator in response to the signal output of said detector as coupled via said low pass filter.

6. The combination of claim 2 wherein said modulating means comprises an amplitude modulator having a first input connected to the output of said discriminator, a second input coupled to the output of said detector, and an output connected to said filtering means.

7. The combination of claim 6 wherein said modulating means further includes a low pass filter coupled between the output of said detector and the second input of said amplitude modulator.

8. The combination of claim 1 wherein said muting means comprises a gate connected between said detector and said audio signal reproducing means and having a control terminal coupled to the output of said rectifying means.

9. The combination of claim 8 wherein said muting means further includes threshold sensing means coupled between the output of said rectifying means and the control terminal of said gate, whereby said threshold sensing means is operative to actuate said gate in response to a direct current signal from said rectifying means having an amplitude exceeding a preselected threshold level.

10. The combination of claim 1 wherein said rectifying means includes a filter network having a short charging time constant and a long discharge time constant.

11. The combination of claim 10 further including an amplifier connected between said filtering means and said rectifying means.

12. The combination of claim 10 wherein said filtering means is operative to pass noise power in a frequency range having a minimum approximately an octave above the highest modulating frequency expected for said receiver.

* * * * *